US010264537B2

(12) United States Patent
Barker

(10) Patent No.: US 10,264,537 B2
(45) Date of Patent: Apr. 16, 2019

(54) TIME CODE CONTROLLED LOGIC DEVICE

(71) Applicant: Walter D. Barker, State College, PA (US)

(72) Inventor: Walter D. Barker, State College, PA (US)

( * ) Notice: Subject to any disclaimer, the term of this patent is extended or adjusted under 35 U.S.C. 154(b) by 0 days.

(21) Appl. No.: 15/350,899

(22) Filed: Nov. 14, 2016

(65) Prior Publication Data

US 2017/0142672 A1     May 18, 2017

Related U.S. Application Data

(63) Continuation of application No. 62/254,982, filed on Nov. 13, 2015.

(51) Int. Cl.
*H04W 56/00*     (2009.01)
*H04B 1/69*     (2011.01)

(52) U.S. Cl.
CPC .............. *H04W 56/00* (2013.01); *H04B 1/69* (2013.01)

(58) Field of Classification Search
CPC ................................ H04B 1/69; H04W 56/00
USPC ........................... 370/342–350; 375/365–371
See application file for complete search history.

(56) References Cited

U.S. PATENT DOCUMENTS

| 7,432,803 | B2 * | 10/2008 | Fails ..................... G08C 17/02 340/4.3 |
| 9,300,713 | B2 * | 3/2016 | Wang .................... H04L 65/602 |
| 2002/0036981 | A1 * | 3/2002 | Park .................... H04L 12/5602 370/230 |
| 2009/0051759 | A1 * | 2/2009 | Adkins .............. G02B 27/2264 348/53 |
| 2015/0120953 | A1 * | 4/2015 | Crowe .................... H04L 65/60 709/231 |
| 2015/0209670 | A1 * | 7/2015 | Furumoto ............. A63F 13/358 463/24 |
| 2016/0142749 | A1 * | 5/2016 | Francis .................. H04H 20/18 725/37 |
| 2017/0163411 | A1 * | 6/2017 | Van Den Berghe ........................ H04L 7/0337 |
| 2017/0176953 | A1 * | 6/2017 | Ogawa ................... G04R 20/02 |

* cited by examiner

Primary Examiner — Man U Phan
(74) Attorney, Agent, or Firm — Cohen & Grigsby, P.C.

(57) ABSTRACT

A synchronization device to synchronize at least one signal with an initiation of an event may generally comprise a time code generator to generate a first time code signal, a synchronization logic unit to calculate a time delay between the first time code signal and a second time code signal to determine when to initiate the event, and generate a time delay signal, and an output unit coupled to the time code generator and synchronization logic unit to receive the time delay signal and generate a signal output to initiate the event in synchronization with the first time code signal. Methods of making and using the synchronization device, a user interface of the synchronization device, and a system comprising the synchronization device are also described.

13 Claims, 4 Drawing Sheets

TIME CODE CONTROLLED LOGIC DEVICE

CROSS-REFERENCE TO RELATED APPLICATIONS

This application claims priority to U.S. provisional application Ser. No. 62/254,982, filed on Nov. 13, 2015, which is hereby incorporated by reference in its entirety.

BACKGROUND

Electronic device configurations for control systems in the entertainment industries, such as, e.g., sound, video, film, television, theater, stage, light, laser, pyrotechnics and other industries may generally utilize electrical communication arrangements to provide device-to-device interconnections. As an example, conventional pyrotechnic display systems may synchronize choreographed fireworks to music. Individual music selections may be combined into a single music program to create a music score for the display. Fireworks may be assigned to an appropriate electrical contact, or cue, to be fired by the firing system at the appropriate time during the choreographed music score. Conventional systems for synchronizing events such as sound, video, film, television, theater, stage, light, laser and pyrotechnics to initiate at a specific time and/or to be choreographed to a musical score may be complicated and/or time consuming for the operator. Accordingly, more efficient and/or cost-effective electrical synchronization devices and methods of making and using the same are desirable.

SUMMARY

A synchronization device to synchronize at least one signal with an initiation of an event may generally comprise a time code generator to generate a first time code signal, a synchronization logic unit to calculate a time delay between the first time code signal and a second time code signal to determine when to initiate the event, and generate a time delay signal, and an output unit coupled to the time code generator and synchronization logic unit to receive the time delay signal and generate a signal output to initiate the event in synchronization with the first time code signal.

A method to synchronize at least one signal with an initiation of an event may generally comprise transmitting a first time code signal from a time code generator, receiving a second time code signal, generating a time delay signal between the first time code signal and the second time code signal, and synchronizing the first time code signal and the second time code signal, and initiating the event.

DESCRIPTION OF THE DRAWINGS

The various embodiments described herein may be better understood by considering the following description in conjunction with the accompanying drawings.

DESCRIPTION

Figure 1:
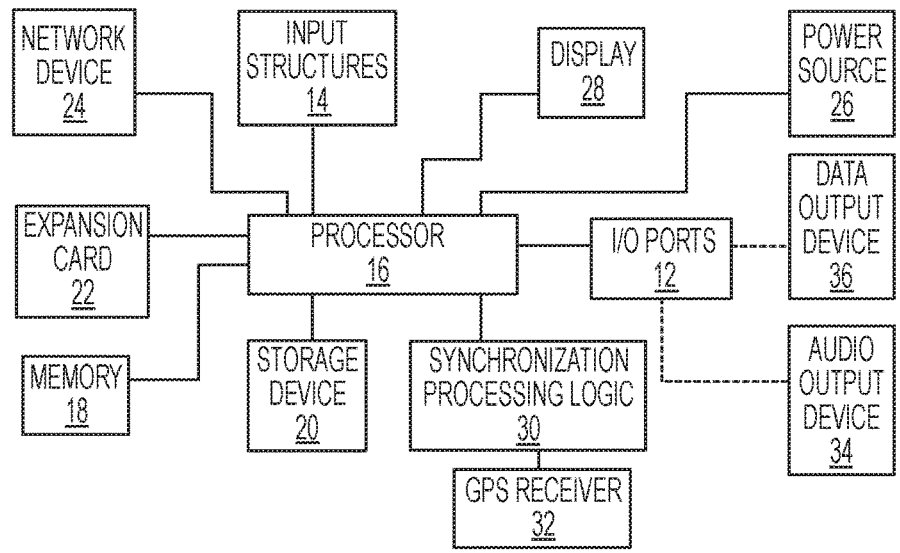
FIG. 1 includes a block diagram of a synchronization device.

As generally used herein, the articles "one", "a", "an" and "the" refer to "at least one" or "one or more", unless otherwise indicated.

As generally used herein, the terms "including" and "having" mean "comprising".

In the following description, certain details are set forth in order to provide a better understanding of various embodiments of synchronization devices and methods for making and using the same. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

According to various embodiments, more efficient and/or cost-effective electrical synchronization devices and methods of making and using the same are described.

The synchronization device may provide features for the entertainment industry, including sound, video, film, television, theater, stage, light, laser, pyrotechnics and other industries. The process of synchronizing sound, video, film, television, theater, stage, light, laser, pyrotechnics and other events may be accomplished using time code. In general, time code is an analog signal or sequence of numeric codes generated at regular (time) intervals. Time code may be utilized for recording and editing, and identifying precise locations in time-based systems. In the case of live events that include sound, picture, video, lighting, lasers, pyrotechnics, and movement of a physical object, time code may synchronize the timing of all devices such that the desired events occur at the desired time and in the desired sequence. For example, fireworks production time code may typically be used to synchronize fireworks to audio effects (i.e., music), lasers, video, and other visual effects while maintaining synchronization among different firework launching locations. An example of a time code standard is the Society of Motion Picture and Television Engineers time code (SMPTE).

Time code may comprise a series of discrete data signals that may be interpolated by time code reader circuitry. Due to the requirements of different industries, several types of time code have been developed: SMPTE 24 (film/ATSC), SMPTE 25 (PAL, SECAM, DVB), SMPTE 30 non-drop, SMPTE 30 drop frame (NTSC) (sometimes referred to as SMPTE 29.97), Frequency-Shift Keying (FSK), and GPS (Global Positioning Satellite) Time.

SMPTE time code is a 24 hour format that ranges from 00:00:00.00 (midnight) to 23:59:59:29 (30 fps SMPTE). Therefore SMPTE time code "wraps around" to account for time values less than 00:00:00.00 or greater than 23:59:59.29/24/23. For example, if the SMPTE input time is 05:00:00.00 and the offset time is −06:00:00.00, the resulting SMPTE output time will be 23:00:00.00. Therefore, if initiation time is 9:30 PM, the SMPTE initiation time will be 21:30:00.00.

SMPTE 24 may be used by the film motion picture industry. SMPTE 24 comprises 24 references or "frames" per second, and therefore has 24 frames or time references per second.

SMPTE 25, also known as SMPTE EBU (European Broadcasting Union), comprises 25 frames per second, and may support the European television system that operates at 25 frames per second.

SMPTE 30, also known as SMPTE 30 non-drop and SMPTE 29.97, may be used in audio applications, such as synchronizing multitrack audio applications or MIDI sequencers. SMPTE 30 drop frame (NTSC) was developed specifically for color television in North America and may be used in video applications. SMPTE 30 drop frame comprises 29.97 frames per second rather than the 30 frames per second in SMPTE 30 non-drop. Since the frame rate is 29.97 frames per second, SMPTE 30 drop frame may increment at a slower rate than real world time. This may lead to a "real" time discrepancy. This is where the "drop frame" comes into play. At predetermined times SMPTE 30 drop will skip or "drop" frames to catch up to real time. The time may be adjusted forward by two frames on every minute boundary except 00, 10, 20, 30, 40, and 50. For example when SMPTE 30 drop frame time increments from 00:00:59:29, the next value will be 00:01:00:02 rather than 00:01:00:00 in SMPTE Non-Drop.

In general, the FSK time format may be used to choreograph an event using time code that can have a negative countdown value. This may allow for events to have an initiation time of 00:00:00 and permits the concept of negative time. This negative (countdown) time may provide an indication to remote operators that time is successfully being received well before the display actually starts.

The synchronization device may be configured to process time as a 24-hour max "day". Since there is no date information (only time), the FireOne FSK output time may be within the range of −11:59:59 to +12:00:00 for the offset and wrap-around time to work properly. The output time is the difference between the input time and offset time.

FireOne FSK time code is a 24-hour time source having a range of −11:59:59 to +11:59:59. FireOne FSK time code may support negative time values. Therefore, FSK time code may provide a lead-in for an event that starts close to zero time. FireOne FKS encodes information through discrete frequency changes of a main carrier frequency wave. FireOne FSK utilizes a binary frequency-shift keying to provide a reliable low data rate signal that may pass through most voice grade audio systems with little or no degradation. Therefore, FireOne FSK may be a reliable time code scheme that provides less data per second than SMPTE formats.

This may be best illustrated with the following example using GPS operation albeit it applies to other input time types.

In this example, a fireworks display is scheduled to begin at 00:00:00 (midnight) with GPS. The offset time is set to 00:00:00 such that the FSK output to be 00:00:00 at midnight. If the operator turns on the GPS at 13:00:00 the day of the show (1 PM in the afternoon on the day of the show and 11 hours prior to show time), the FSK output will be −11:00:00. Similarly, at 02:00:00 (2 AM) the output will be 02:00:00. However, the FSK time will wrap around 12 hours after zero. This means that any offset done on time where FSK results in a time greater than 12:00:00 will convert to a negative number. The user may wish to allow a 10-30 second time interval after the initiation time to account for the fact that aerial shells must be launched prior to the assigned burst time.

Time code may be derived from the GPS Time. GPS Time is based on atomic clocks in the GPS satellites that are monitored and set to Coordinated Universal Time (UTC) master clocks. This output and the time calculated from the GPS satellite transmissions is displayed as UTC time, which is equivalent to Greenwich, UK time except during Daylight Savings Time when UTC is Greenwich time plus one hour. It may not be obvious to the casual observer, but persons skilled in the art would appreciate that GPS is dependent upon highly accurate time signals.

The synchronization device may comprise one or more of a time code generator, a time code regenerator, a GPS receiver, a stereo audio storage and playback device, at least one MIDI controlled device, a control output, a frequency-hopping spread spectrum (FHSS) communication device, an Ethernet communication device, and a precision time referenced contact closure and logic level activation device (a logic unit) electrically connected to central processing unit (CPU) or microprocessor for receiving, processing, and transmitting data, such as time inputs up to millisecond accuracy.

The synchronization device may be configured, for example, to generate time code, receive time code, regenerate received time code, translate inputted time code to different outputted time code, store and play music data, start events at predetermined times, through contact closure or logic level switching, receive precision timing data from GPS satellites, communicate one or more of the foregoing through wireless communications and/or wired communication, e.g., Ethernet connections or other similar analog or digital data interfaces, and set and reset global time setting for any other synchronization devices connected or networked to a master synchronizations device.

The synchronization device may regenerate and/or synchronize to time codes and GPS Time signals and store and trigger audio files on command. The synchronization device, including a radio frequency (RF) device, may simultaneously provide time code synchronization, audio playback, and control external equipment while communicating via the FHSS radio link or Ethernet connection. The synchronization device may be characterized as a multiple purpose/multi-tasking device.

The synchronization device may be programmed to identify, acknowledge, and process the following inputs: GPS Time, analog time signals, SMPTE 24 (film/ATSC), SMPTE 25 (PAL, SECAM, DVB), SMPTE 29.97 (30 drop frame NTSC), SMPTE 30 non-drop, SMPTE 50, 50.95 and 60, FSK time code, MIDI time code, wireless communications, and Ethernet communications. The synchronization device may internally generate and/or regenerate the time codes e.g., SMPTE and FSK time codes.

The synchronization device may be programmed to receive and process the following time codes: SMPTE 24, SMPTE 25, SMPTE 29.97 (30 drop frame), SMPTE 30 no-drop, SMPTE 50, 50.94 and 60, FireOne FSK, Pyrodigital FSK, MIDI, and GPS Time.

The synchronization device may be programmed to process and transmit the following outputs: SMPTE 24, SMPTE 25, SMPTE 29.97 (30 drop frame), SMPTE 30 no-drop, SMPTE 50, 50.94 and 60, FireOne FSK, Pyrodigital FSK, MIDI time code, GPS Time, wireless communications, 2-Channel (stereo audio playback), and time controlled contact closure and logic level switching.

A synchronization device to synchronize at least one signal with an initiation of an event may generally comprise a time code generator to generate a first time code signal, a synchronization logic unit to calculate a time delay between the first time code signal and a second time code signal to determine when to initiate the event, and generate a time delay signal, and an output unit coupled to the time code generator and synchronization logic unit to receive the time delay signal and generate a signal output to initiate the event in synchronization with the first time code signal. The synchronization logic unit may receive and process the first time code signal to determine when to initiate the event. The synchronization device may transmit the time delay signal to the output unit, a controller, and/or additional networked synchronization devices. The event may comprise at least one of an audio event, a video event, a picture event, a laser event, a light event, a pyrotechnic event, theatrical event, and movement of a physical object.

The first time code signal may comprise one of an initiation time, a time of day, and an elapsed time, and the second time code signal comprises a universal time. The time code may comprises at least one of SMPTE format with a default frame rate, SMPTE format with a frame rate of 23.98 frames/second, SMPTE format with a frame rate of 24 frames/second, SMPTE format with a frame rate of 25 frames/second, SMPTE format with a frame rate of 29.97 frames/second, SMPTE format with a frame rate of 30 frames/second, SMPTE format with a frame rate of 50 frames/second, SMPTE format with a frame rate of 50.94 frames/second, SMPTE format with a frame rate of 60 frames/second, UTC format, GMT format, FireOne FSK format, Pyrodigital FSK format, and MIDI time code format.

The device may comprise a controller in electronic communication with the output unit and programmed to initiate the event. The controller may be programmed to operatively control at least one of a display, a speaker, a laser, a light, a pyrotechnic, a theatrical device, such as a flame and cryogenic, and an actuator to move a physical object. The controller may comprise a time clock to generate the second time code signal.

The device may comprise a GPS receiver to receive at least one of the first time code signal comprising the time of day and the second time code signal comprising the universal time selected from UTC and GMT.

The device may comprise an internal time code generator to generate the time code directly. This internal time code may provide an initiation time source.

The device may comprise a communication device in electronic communication with the output unit to transmit the signal output to the controller to initiate the event. The communication device may comprise at least one of a FHSS communication device and an Ethernet communication device.

The device may comprise a radio frequency (RF) device in electronic communication with the synchronization logic unit and output unit. The RF device may comprise a wireless RF device. The RF device may simultaneously provides time code synchronization and/or GPS synchronization, time code and/or GPS initiated media output, and control of the initiation of the event while communicating via the communication device.

The device may comprise a storage device in electronic communication with the controller to store at least one of audio data, video data, audiovisual data, text files, data files, time code data, and control data.

The device may comprise a media output device to output at least one of audio data, video data, audiovisual data, text files, data files, and time code data. The media output device may output media stored in the storage device.

The device may comprise a storage device electrically connected to the controller to store at least one of audio data, video data, time code data, location data (e.g., GPS data), and control data.

The device may comprise a display coupled to the time code generator and synchronization logic unit to display at least one of a value of the first time code signal and a value of the time delay signal.

Referring to FIG. 1, the synchronization device may include various internal and/or external components that contribute to the function of the device. Those of ordinary skill in the art will appreciate that the various functional blocks shown in FIG. 1 may comprise hardware elements (including circuitry), software elements (including computer code stored on a computer-readable medium) or a combination of both hardware and software elements. For example, the device 10 may include input/output (I/O) ports 12, input structures 14, one or more processors 16, memory device 18, non-volatile storage 20, expansion card(s) 22, networking device 24, power source 26, display 28, synchronization processing logic 30, a GPS receiver 32, audio/data output device 34, and data output device 36.

I/O ports 12 may include ports configured to connect to a variety of external devices, including controllers and/or other synchronization devices. In various embodiments, the data output device includes a controller programmed/configured to initiate the event, and the I/O ports 12 may include a data port configured to couple the data output device 36 to the synchronization device 10. In various embodiments, the audio/data output device 34 may include speakers integrated with the device 10.

Input structures 14 may provide user input or feedback to processor(s) 16. For instance, input structures 14 may be configured to control one or more functions of the device 10, such as applications running on the device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on device 10. Additionally, input structures 14 may include a touch sensitive mechanism provided in conjunction with display 28. In such embodiments, a user may select or interact with displayed interface elements via the touch sensitive mechanism.

Processor(s) 16 may include one or more microprocessors, such as one or more "general-purpose" microprocessors, application-specific processors (ASICs), or a combination of such processing components. For example, processor(s) 16 may include instruction set processors (e.g., RISC), graphics/video processors, audio processors, and/or other related chipsets. Processor(s) 16 may provide the processing capability to execute applications on the device 10, such as a play back digital audio data stored on the device 10 (e.g., in storage device 20). In various embodiments, processor(s) 16 may also include one or more digital signal processors (DSP) for generating, and/or regenerating time code data.

Instructions or data to be processed by processor(s) 16 may be stored in memory 18, which may be a volatile memory, such as random access memory (RAM), or as a non-volatile memory, such as read-only memory (ROM), or as a combination of RAM and ROM devices. For example, memory 18 may store firmware for the device 10, such as an operating system, applications, graphical user interface functions, or any other routines that may be executed on the device 10.

The synchronization device may include non-volatile storage device 20, such as flash memory, a hard drive, or any other optical, magnetic, and/or solid-state storage media, for persistent storage of data and/or instructions. By way of example, non-volatile storage 20 may be used to store data files, including audio data, as well as any other suitable data.

The synchronization device may include network device 24, which may be a network controller or a network interface card (NIC) that may provide for network connectivity over a wireless 802.11 standard or any other suitable networking standard, such as a local area network (LAN), a wide area network (WAN), such as an Enhanced Data Rates for GSM Evolution (EDGE) network, a 3G data network, a 4G data network, a 5G data network, or the Internet.

Display 28 may be used to display various images generated by device 10, such as a GUI for an operating system or for the above-mentioned media player application. Display 28 may be any suitable display such as a liquid crystal display (LCD), electroluminescent display (ELD), plasma display, or an organic light emitting diode (OLED) display, for example. Additionally, display 28 may be provided in conjunction with the above-discussed touch-sensitive mechanism (e.g., a touch screen) that may function as part of a control interface for the device 10.

GPS satellites transmit signals that include three types of information: (1) a pseudorandom code identifying the satellite, (2) ephemeris data that includes the current date and time as well as the satellite's status, and (3) almanac data that includes the position where each satellite should be at particular point in time. Ephemeris data may include a set of parameters that mathematically describes the path that the satellite is following as it orbits the Earth. This data may be used to accurately calculate the location of the satellite at a particular point in time. GPS information acquired from at least three GPS satellites may be used to determine valid time. GPS information acquired from less than three GPS satellites may not be considered valid.

Time-To-First-Fix (TTFF) is a measure of time required for a GPS receiver to acquire satellite signals and navigation data, and calculate a position solution (called a fix). The TTFF may be described in three more specific scenarios: (1) cold start; (2) normal start; and (3) hot start. As mentioned above, the device 10 may include GPS receiver 32. The GPS receiver 32 may receive GPS satellite information and be programmed to determine the latitude, longitude, altitude, and time of the synchronization device based on the GPS satellite information. If any of the latitude, longitude, altitude, and time is stored in the device, a more accurate fix may be obtained with fewer satellites in view. In general, receiving GPS satellite information from more GPS satellites may improve accuracy of the fix.

During a hot start, the GPS receiver has ephemeris data and almanac data. For example, the ephemeris data and/or almanac data may be stored in the device. A faster TTFF may be possible when the satellite information is stored in the device during a hot start.

During a cold start, the GPS receiver lacks accurate/valid satellite information, such as ephemeris data and almanac data or cannot receive the satellite information. During a cold start, the GPS receiver systematically searches for GPS satellites to acquire the satellite information. The GPS receiver may take up to several minutes to acquire such satellite information during a cold start. If the GPS receiver has not been used for a long period of time, it may take up to 20 minutes for the GPS receiver to acquire sub-second accuracy During a normal start, the GPS receiver may obtain sub-second accuracy within a few seconds of operation.

The GPS receiver 32 may be configured to receive a universal time selected from UTC and GMT. For example, in various embodiments, GPS receiver 32 may include one or more antennas configured to receive GPS broadcast signals to be processed by the processors 16 to determine the location of the device 10. A user may provide the initiation time of the event. In various embodiments, the synchronization processing logic 32 may be configured to calculate a time delay between an initiation time and universal time, such as UTC and GMT, provided by the GPS receiver 32. The time delay enables the initiation time to be synchronized to the universal time. Thus, when device 10 is programmed/configured to initiate the event, a user may enter the local time to initiate the event and/or audio playback because the device 10 shifts the initiation signal by the time delay.

The GPS receiver may be programmed to correct for the UTC Time-Zone offset to generate "Local Time Zone" corrected time. GPS time may be received as UTC time or GMT. This value may configure the GPS receiver to return time in the local time zone. The UTC offset may be processed before the system offset such that the time received from the GPS with the UTC correction is the input time for the system.

The synchronization device may be configured to synchronize to GPS Time. A person having ordinary skill in the art would understand that UTC leap seconds may be used to calculate the actual time. GPS transmissions do not account for leap seconds. Leap seconds may be added every few years to adjust for the rotation of the earth in combination with its orbit not being exactly 365.25 days per year. To date, 16 seconds have been added. Therefore, this value may be at least 16 and may change when the GPS receiver receives data from the GPS satellite that changes this value. The synchronization device may be configured such that the user cannot change the value of the UTC leap second. GPS receivers that have not been in use for a long time may default to zero. It may take several minutes to receive this value from the GPS satellites. The synchronization device may store this value to use when the new value has not been received even if the battery is fully discharged or removed.

The components of synchronization device may be contained within a housing. The housing may comprise plastic or metal, or other suitable material with sufficient strength and durability to protect the components from damage and the external environment. The synchronization device may comprise a plurality of interface buttons and inputs/outputs exposed on the surfaces of the housing. For example, using the interface buttons and the display, a user may select and modify the settings of synchronization device as described in more detail below.

A system to synchronize media and an event, such as an audio event, a video event, a picture event, a laser event, a light event, a pyrotechnic event, a theatrical event, and movement of a physical object, may comprise the synchronization device as described herein.

Figure 2:
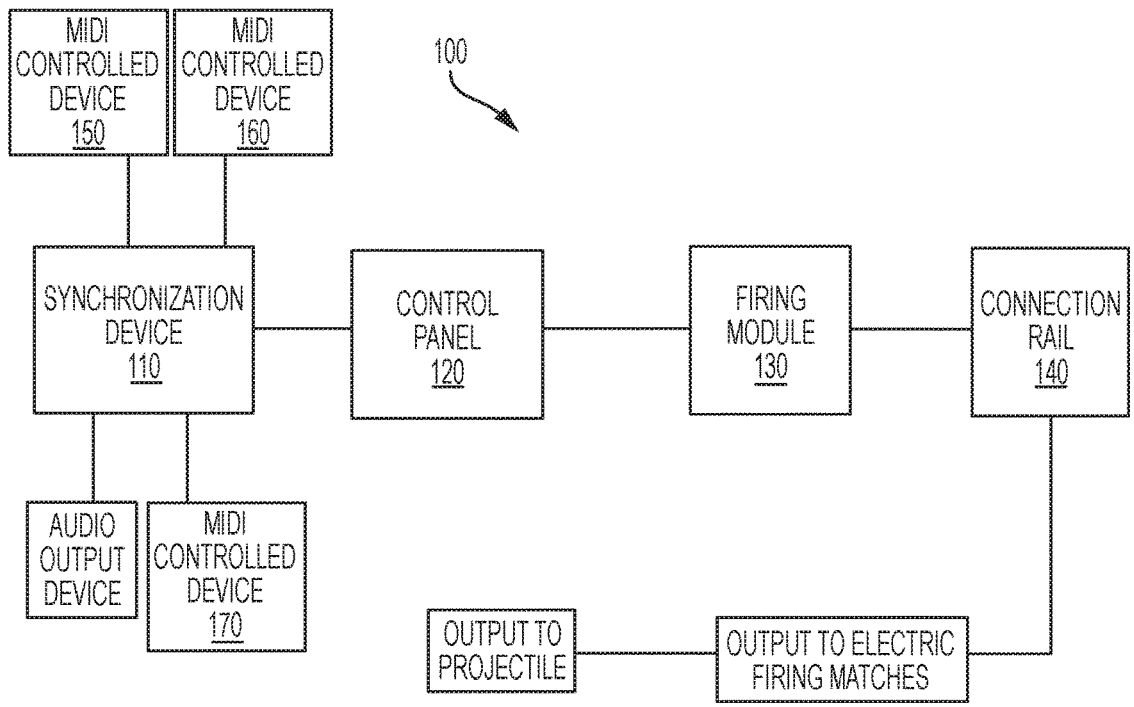
FIG. 2 includes a block diagram of a fireworks firing system comprising a synchronization device.

Referring to FIG. 2, a fireworks firing system may generally comprise the synchronization device 100 as described herein, which may comprise a computer (not shown), a synchronization device 110, a control panel 120, a firing module 130, a connection rail 140, an electric firing match (not shown), a projectile (not shown), one or more of MIDI controlled devices 150, which may comprise a display, a speaker, a laser, a light, a pyrotechnic, a theatrical device, such as a flame and cryogenic, and an actuator to move a physical object as well as other SMPTE or FSK time code controlled devices 160, 170, which may comprise one or more of an audio device, a video device, a picture device, a laser device, a light device, a pyrotechnic device, theatrical device, and a device to move a physical object.

A digital firework firing system and choreography system is commercially available from Pyrotechnics Management Inc., State College, Pa. The system may include software configured to create manually fired firework displays and choreographed firework displays that may include digitally controlled theatrical effects, such as fireworks, lights, lasers, flame units, fog and cryogenic devices, and the like. A computer or processor may operate the software and may be in electrical communication with the synchronization device 110 and/or control panel 120. The synchronization device 110 may be in electrical communication with the control panel 120. The control panel 120 may be in electrical communication with the firing module 130. The firing module 130 may comprise a microprocessor controlled and capacitive discharge module. The firing module 130 may be in electrical communication with the connection rail 140. The connection rail 140 may have at least one individual connection terminal (i.e., cues) configured to electrically connect to an electric firing match (not shown) and projectile (not shown). The synchronization device 110 may be in electrical communication with one or more MIDI controlled devices 150, 160, 170.

A method for initiating an event, such as an audio event, a video event, a picture event, a laser event, a light event, a pyrotechnic event, theatrical event, and movement of a physical object, may generally comprise receiving a first time code signal comprising an initiation time; receiving a second time code signal comprising a universal time selected from one of UTC and GMT; generating a time delay between the first time code signal and second time code signal; and synchronizing the first time code signal to the second time code signal based on the time delay to initiate the event. The method may comprise outputting a text file, a data file, an audio file, a video file, and an audiovisual file synchronized to the first signal. The method may comprise transmitting a signal generated by the synchronization device to the controller to initiate the event. The method may comprise transmitting a signal generated by the synchronization device to a communications device and transmitting a signal generated by the communications device to a controller to initiate the event. The synchronization device may be in electrical communication with the controller and/or a second synchronization device via a data transmission line, an Ethernet connection, or a wireless transmission mode.

A method of synchronizing at least one signal with an initiation of an event may comprise receiving a first time code signal; receiving a second time code signal comprising a universal time; generating a time delay between the first time code signal and second time code signal; and synchronizing the first time code signal to the second time code signal based on the time delay to initiate the event. The method may comprise outputting a text file, a data file, an audio file, a video file, and an audiovisual file synchronized to the first signal. The method may comprise transmitting a signal generated by the synchronization device to a controller to initiate the event. The method may comprise transmitting a signal generated by the synchronization device to a communications device and transmitting a signal generated by the communications device to a controller to initiate the event. The synchronization device may be signally connected to the controller and/or a second synchronization device via a data transmission line, an Ethernet connection, or a wireless transmission mode.

The method may comprise generating a first time code signal by a time code generator, calculating a time delay between the first time code signal and a second time code signal by a synchronization logic unit to determine when to initiate the event, generating a time delay signal by the synchronization logic unit, receiving and processing the time delay signal by the output unit, and generating a signal output by the output unit to initiate the event in synchronization with the first time code signal. The method may comprise receiving and processing the first time code signal by the synchronization logic unit. The method may comprise receiving and processing the second time code signal by the synchronization logic unit and/or Global Positioning System receiver. The method may comprise transmitting the time delay signal by the synchronization logic unit to the output unit, a controller, and/or additional networked synchronization devices.

The method may comprise transmitting the signal output by the output unit and receiving the signal output by the controller programmed to process the signal output and initiate the event. The controller may be programmed to operatively control at least one of a display, a speaker, a laser, a light, a pyrotechnic, a theatrical device, such as a flame and cryogenic, and an actuator to move a physical object. The method may comprise generating the second time code signal by the controller's time clock.

The method may comprise transmitting the signal output from the output unit to a communication device and/or a radio frequency (RF) device.

The method may comprise receiving, storing, and transmitting at least one of audio data, video data, audiovisual data, text files, data files, location data (e.g., GPS data), time code data, and control data by a media output device and/or storage device. The data may be received and/or transmitted via the communications device or the inputs and outputs.

The method may comprise providing a user interface and displaying the first time code signal, second time code signal, and/or the time delay signal.

The synchronization device may comprise: on/off soft touch, XLR balanced and ¼" unbalanced time code and audio inputs, XLR balanced time code and audio outputs, battery and AC power operation, handheld or desk-top operation, audio output, internal monitor speaker, GPS antenna input, wireless or Ethernet communications between time code units. The synchronization device may comprise audio outputs, balance and unbalanced right and left channel outputs, a maximum output level +10 dBu, a total harmonic distortion less than 0.07%. The synchronization device may output audio file formats up to 48 kHz sample rate audio files, MP3: MPEG 1 & 2 audio layer III (CBR+VBR+ABR), WAV: 8, 16, 24 and 32-bit PCM, IMA ADPCM, G.711 u-law and A-law, G.722, ADPCM. The synchronization device may comprise time code output XLR balanced up to a maximum output level 0 dBu. The synchronization device may comprise MIDI output. The synchronization device may comprise relay outputs (expansion port) pins 1 and 2 dry contact closure, maximum 24 volts at 500 milliAmperes, pins 5 and 6 logic level output (Pin 5=ground, Pin 6=+5 VDC), maximum 5 volts at 25 milliAmperes.

Figure 3:
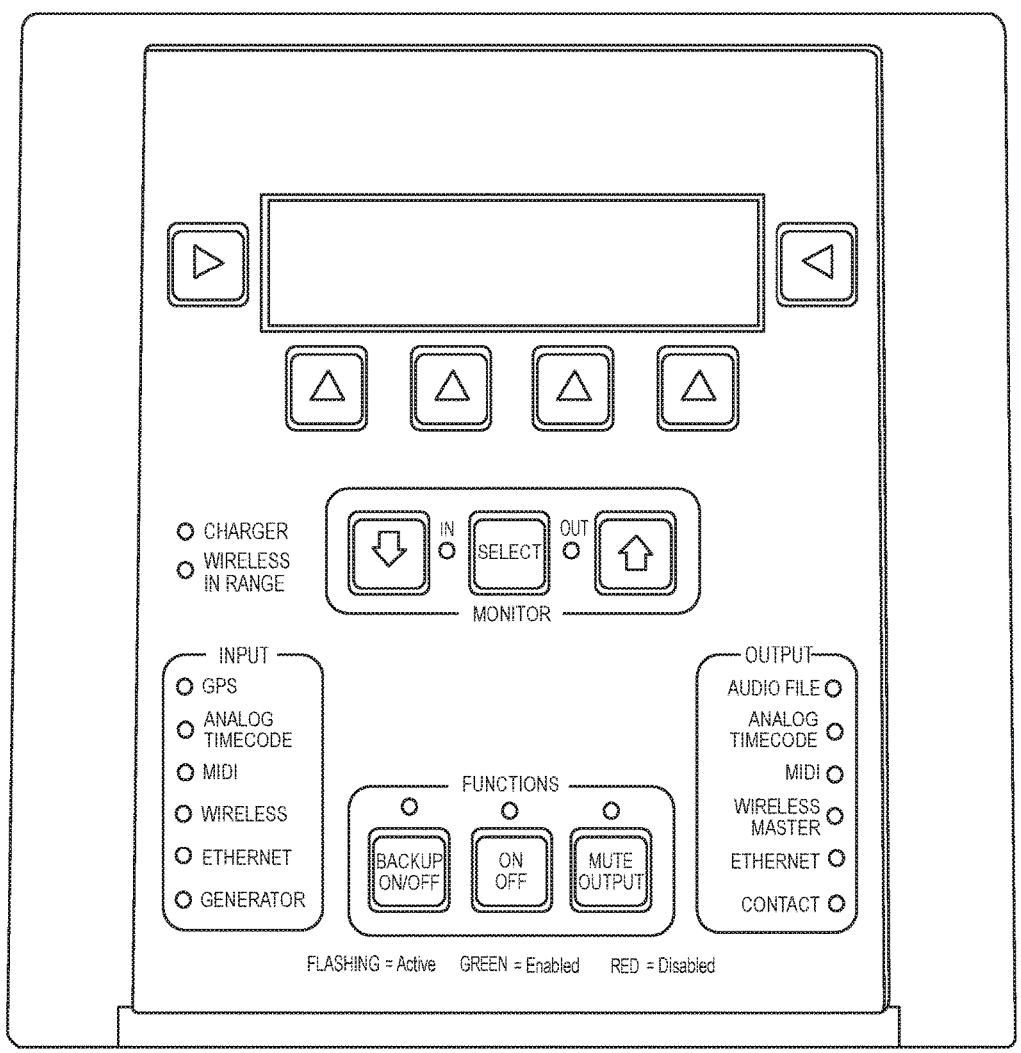
FIG. 3 includes a perspective view of a synchronization device.
Figure 4:
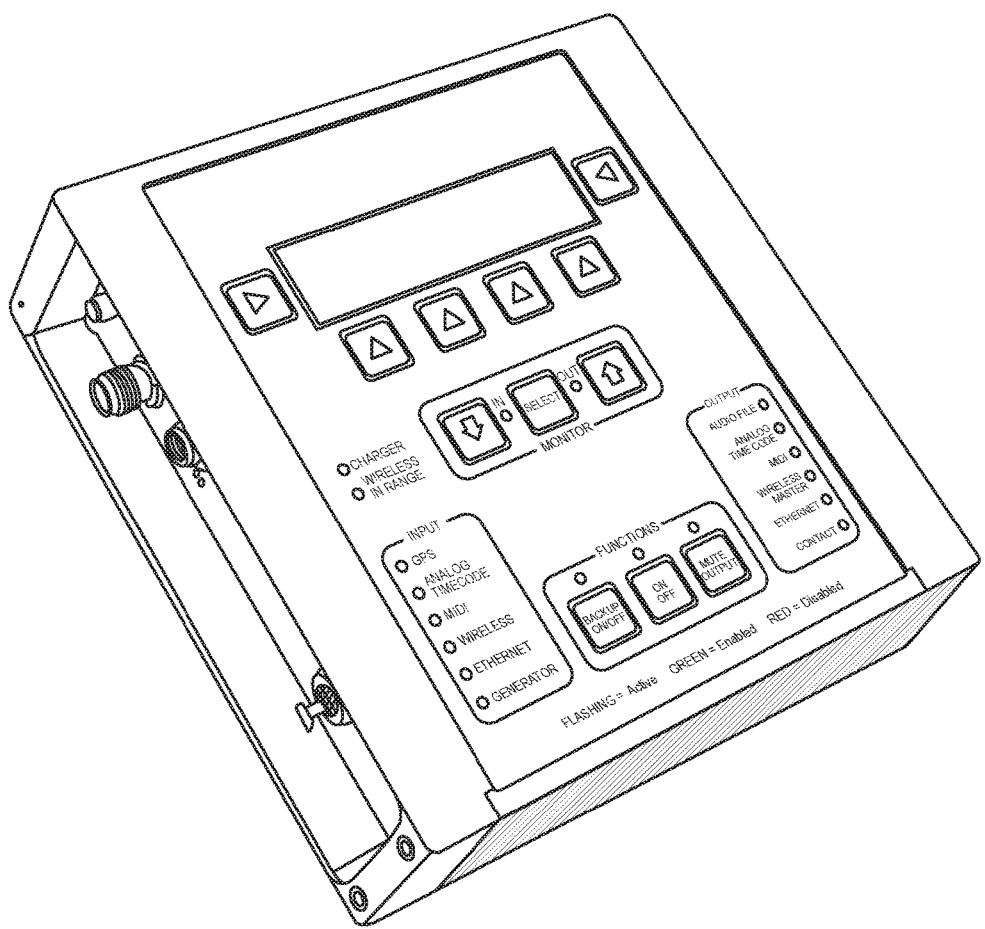
FIG. 4 includes a top view of the synchronization device of FIG. 3.

Referring to FIGS. 3 and 4, the synchronization device may comprise a user interface comprising soft touch membrane buttons and an OLED screen. The synchronization device may comprise a front panel having handheld control surfaces and an OLED graphic display and LED status indicators. The synchronization device may comprise an OLED graphic display having a plurality of buttons. Each button's function may be determined by the associated iconic indications displayed on the OLED screen. The buttons may be assigned, for example, as "Play", "Stop", and "Pause" buttons in one screen and as "up/down" and "right/left" buttons in another screen. The battery charger status LED ("Charger") may be located to the left middle portion of the front panel directly above the "Wireless In-Range" LED. The "Charger" LED may be red when the battery charger is charging and green when the battery is charged. Absent a battery, the charger LED may flash between red and green.

The audio monitor selector buttons group may be positioned in the middle of the front panel. The audio monitor selector buttons may select the audio source for the internal monitor speaker and the volume level. The left down pointing arrow button may lower the volume. The right up pointing arrow button may raise the volume. The "Select" button may change the audio source (as shown on the OLED display screen) that is being monitored from one of the following: speaker off, audio left and right, audio left, audio right, analog time code input, and analog time code output.

The monitor buttons group may provide the user with the ability to audibly monitor the time code inputs and outputs in addition to any selected media file. Referring to the lower left corner of the front panel, the input LED indicators may provide a visual indication of the status of each input: "GPS", "Analog Timecode", "MIDI", "Wireless", "Ethernet" and "Generator". One input may be used at a time. A non-flashing green LED may indicate that the input is selected or enabled. A flashing green LED may indicate that the input is active. A red LED may indicate that the input has been disabled. Referring to the lower right corner of the front panel, the output LED indicators may provide a visual indication of the status of each output: "Audio File", "Analog Timecode", "MIDI, "Wireless Master", "Ethernet" and "Contact". One or more outputs may be used at a time. For example, multiple outputs may be enabled at the same time depending on the configuration settings. A non-flashing green LED may indicate that the input is selected or enabled. A flashing green LED may indicate that the input is active. A red LED may indicate that the input has been disabled. Referring to the lower middle portion of the front panel labeled "Functions", the "Backup ON/OFF" button may enable and disable the internal generator from duplicating the function of the incoming time data if the incoming data is lost or stops for any reason. The "ON/OFF" button may turn the synchronization device ON and OFF. The "Mute Output" button may mute (stops or disables) all outputs, and may toggle all active output LEDs to red (disabled).

Figure 5:
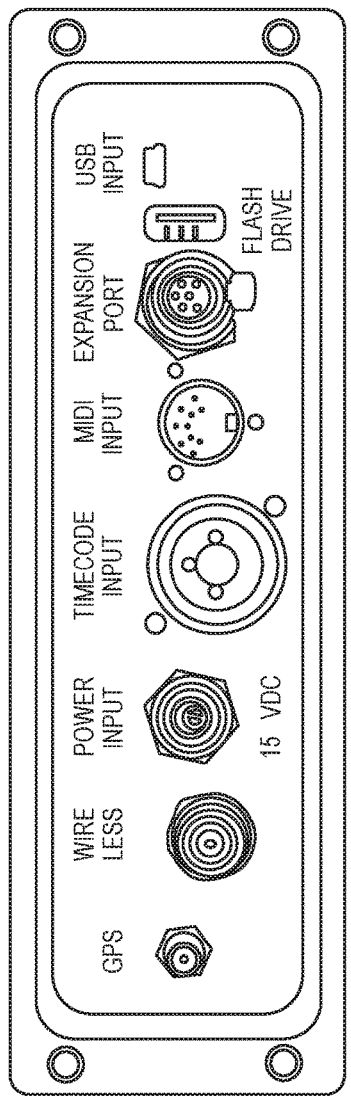
FIG. 5 includes a side view of the synchronization device of FIG. 3.

Referring to FIG. 5, the synchronization device may comprise one or more of the following inputs: GPS input, wireless input, power input, time code input, MIDI input, expansion port input, flash drive input, and USB input. The GPS input may comprise a standard SMA connector to couple to the GPS antenna. The wireless input may comprise a reverse TNC antenna connect to couple an antenna connector or a hi-gain antenna. The frequency hopping spread spectrum wireless communications link may provide communication between other synchronization devices wirelessly. The wireless input may provide wireless communication to syndicate commands to other synchronization devices and respective control panels. The wireless input may provide a master programming link to control and set parameters on all associated synchronization devices for system operation. The power input may couple to a power adapter to charge the internal battery of the synchronization device. The power adapter may be configured to charge the battery at 15 volts DC at 1.5 amperes in 4 to 5 hours depending on the battery condition. The time code input may comprise a transformer isolated, combination 3-pin XLR type and ¼ inch plug balanced or unbalanced jack for inputting FSK or SMPTE time code into the synchronization device. The MIDI input may comprise a standard 5-pin MIDI optically isolated input jack. The expansion port input may connect to a handheld wireless control panel. Pins 1 and 2 may comprise a standard FireOne 2-Wire interface for interconnect to a FireOne handheld wireless control panel available from Pyrotechnics, Inc. Pins 5 (ground) and 6 (+15 VDC) may provide power to the FireOne handheld wireless control panel. The flash drive input may provide an input for updating the firmware of the synchronization device from a USB flash drive and/or copy audio files directly from a USB flash drive to the internal storage of the synchronization device. The USB input may connect the synchronization device to a computer for audio file transfer and/or firmware updates.

Figure 6:
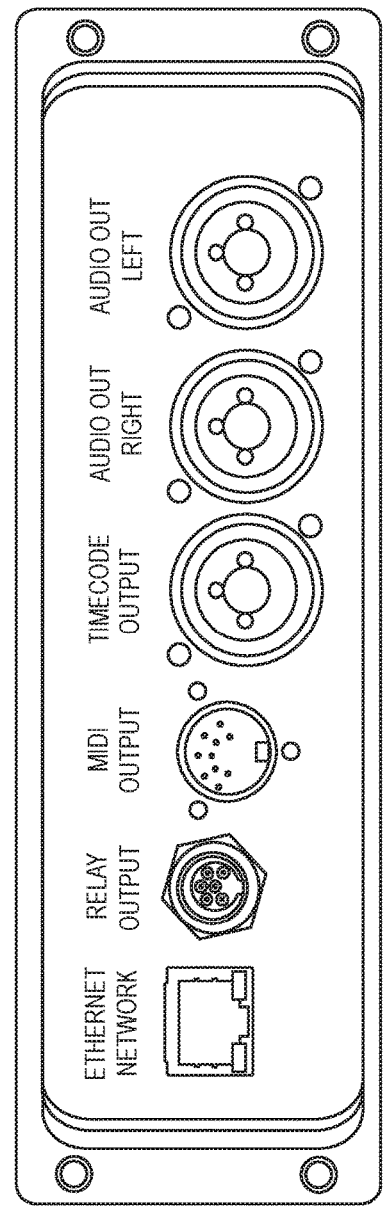
FIG. 6 includes a side view of the synchronization device of FIG. 3.

Referring to FIG. 6, the synchronization device may comprise one or more of the following outputs: Ethernet output, relay output, MIDI output, time code output, and audio outputs. The Ethernet output may comprise a wired communications link that provides communication between other synchronization devices to syndicate time code among the respective devices and control panels. The Ethernet output may provide a master programming link to set parameters on other synchronization devices for system operation. The relay output may comprise contact closure and logic level switching. Pins 1 and 2 may comprise a dry contact closure and contacts having a maximum rating of 24 volts at 500 milliamperes. Pins 5 (ground) and 6 (+5 VDC) may provide a 5 volt switching logic having a maximum rating of 5 volts at 25 milliAmperes. Pins 3 and 4 may comprise the safety/dead man interface that control pins 3 and 4 of Expansion Port input. The MIDI output may comprise a standard 5-pin MIDI optically isolated output input jack. The time code output may comprise a 3-pin XLR balanced receptacle for outputting analog FSK or SMPTE time code. The audio outputs may comprise a right audio output and a left audio output. The right audio output may comprise a 3 pin XLR male connector line level output having a maximum output level at +10 dBu. The output level may not be adjustable, and may be determined by the level in the source audio file. The XLR pin protocol may comprise: Pin 1 (shield), Pin 2 (positive), and Pin 3 (negative). The left audio output may comprise a 3 pin XLR male connector line level output with a maximum output level at +10 dBu. The output level may not be adjustable, and may be determined by the level in the source audio file. The XLR pin protocol may comprise: Pin 1 (shield), Pin 2 (positive), and Pin 3 (negative).

The synchronization device may comprise a GPS antenna connected to the GPS Antenna input connector to receive GPS time code.

The synchronization device may generate an offset time. Offset time may allow the user to shift the input time by some amount. The synchronization device may process the input time, add or subtract the offset time, and generate the output time based on that value. The output time may wrap-around at different intervals depending on the time code.

For example, SMPTE time code is a 24-hour time source and the output time will wrap around every 24-hours. Because of this, the theoretical maximum single show length is 23:59:59. For example, if the offset is set to −10:00:00 and the incoming time is +09:00:00, the output time would be 23:00:00. Similarly, if the offset is set to +10:00:00 and the incoming time is +22:00:00, the output time will be +08:00:00.

Pyrodigital FSK time code has a maximum time of 54 minutes and 36 seconds (00:54:36). This means that a show using that time code can be at most 00:54:36 in length. The synchronization device wraps Pyrodigital FSK time code every hour. Any output time from 00:54:37 to 00:59:59 is invalid. For example: If the offset time is set to +00:10:00 and the incoming time is 00:52:00, the output time will be 00:02:00.

FireOne FSK time code is a 24-hour time source with the range of −11:59:59 to +11:59:59. This means that the theoretical maximum show length could be 12-hours with an additional 12-hours of countdown time before the show. The output will wrap around to −11:59:59 after it reaches +11:59:59. For example, if the offset is set to −10:00:00 and the incoming time is +09:00:00, the output time would be −01:00:00. Similarly, if the offset is set to +10:00:00 and the incoming time is +22:00:00, the output time will be −08:00:00

The synchronization device may output multiple types (e.g., analog FSK and/or wireless) at the same time, the output range may be the same for all types. The following table lists the valid output range for each type of analog time

| Output Type | Output Min | Output Max |
| --- | --- | --- |
| SMPTE (any type) | 00:00:00 | +23:59:59 |
| Pyrodigital FSK | 00:00:00 | +00:54:36 |
| FireOne FSK | −11:59:59 | +11:59:59 |

The input time code type may comprise, none, GPS, analog, (SMPTE and FSK), generator, and wireless.

The output analog time code type may comprise FireOne FSK, Pyrodigital FSK, SMPTE 30N, SMPTE 25N, and SMPTE 24N. The synchronization device may output multiple types (e.g., analog FSK and/or wireless) at the same time, the output range may be the same for all types. The following table lists output range for each type of analog time code types:

| Analogy Output Type | Output Min | Output Max |
| --- | --- | --- |
| None | −11:59:59 | +11:59:59 |
| SMPTE (any type) | 00:00:00 | +23:59:59 |
| Pyrodigital FSK | 00:00:00 | +00:54:36 |
| FireOne FSK | −11:59:59 | +11:59:59 |

The synchronization device may provide the time source directly. The time generator may start the time code at the offset time.

The synchronization device may use the incoming GPS Time (after UTC time correction) as the time source. The synchronization device may automatically process any audio file or triggers once the file selection and offset is configured. The synchronization device may process the time and generate an output time (if configured).

Once an audio file (or trigger) has been processed, it may not be activated again unless the offset time is adjusted, the reset button is pressed or the device is power cycled.

The offset may be configured by using the time of the event as a negative number as the offset when the event is scripted as a zero-relative version (meaning that the shot clock starts at 00:00:00). For example, an event having a start time at 21:30:00, the offset time may be set to the negative of the start time, −21:30:00 in this case such that the output time is 00:00:00 at 21:30:00.

The synchronization device may receive, process, and/or transmit SMPTE (24, 25, 29.97, 30, 50, 50.94, 60) and FSK time code formats. The synchronization device may automatically detect the incoming time source. Once an audio file (or trigger) has been processed, it may not be activated again unless the offset time is adjusted, the reset button is pressed or the device is power cycled.

The synchronization device may automatically detect the analog input time. The synchronization device may take several seconds to perform the initial synchronization and lock. Therefore, the initiation time (audio file started, output time to fire cues) may be selected at least several seconds after the detection of the input time.

One or more remote synchronization devices may receive the time via the communication device and/or wireless radio device from a master synchronization device. The remote synchronization device may transmit the time. The remote synchronization device may not be configured to add additional offset time. The master synchronization device may transmit the offset time to the remote synchronization device. The master and remote synchronization devices may be on the same RF channel. Each remote synchronization device may have a unique address. The master synchronization device may query the remote synchronization devices for radio information and remotely configure them.

The synchronization device may be configured to program the following time settings: (1) the input source (e.g., generator, GPS, analog, wireless); (2) the offset time; and (3) the output analog time code type. The synchronization device may apply the offset time to the input time to generate the output time.

When wireless transmitting time to remote synchronization devices any outputting media, e.g., playing audio files, on remote synchronization devices, the media output may be delayed at least several seconds. For example, if using time generator, there will be delays between the master and remote media files if the offset time is 00:00:00 and the audio start time is 00:00:00. Without being bound to any particular theory, it may take several milliseconds for wireless transmission of the information to the remote synchronization devices.

The first media output may be delayed. In this example, the master synchronization device may start the audio file immediately, and the remote synchronization devices may start after receiving the media output. This may cause noticeable delays in the audio output between the master and remote synchronization devices. The delay may be reduced and/or eliminated by providing at least several seconds of offset time before outputting media or having the audio file start at a time other than the offset time. The value of the offset time and the media start time may be the different, e.g., by at least several seconds. The delay may be reduced and/or eliminated by having the input time code source running for several seconds of good lock before the entire network of remote synchronization device are synchronized.

The synchronization device may be configured as a master synchronization device to transmit its output time to a network of remove synchronization device(s). The master synchronization device may transmit over the communication device, e.g., wireless link and Ethernet connection. Only one master synchronization device may be used within a network on the same channel. The synchronization devices must be on the same channel or they will not be able to communicate.

The synchronization device may be configured for Frequency Hopping Spread Spectrum (FHSS) operation. The synchronization device may "hop" between different frequencies over portions of the radio band. There may be several "hops" per message. This may provide the advantage of not using a single frequency for a long time (which may have an interferer) and using multiple frequencies to send the same message. The FHSS operation may provide robust operation even in hostile RF environments.

The synchronization device may be programmed with a security key code to encrypt the communications between synchronization devices. The encryption key code may provide that the synchronization devices only communicate with other intended synchronization devices. The password may be the same or different for each of the networked synchronization devices.

The synchronization device may be configured as a remote synchronization device. A remote synchronization device may receive time from a master synchronization device as described above. The configuration parameters (e.g., input time, channel, address, key code) of the remote synchronization device may be changed remotely as well. The master synchronization device may transmit the configuration parameters and wait for a response from the remote synchronization devices. The configuration parameters for all of the remote synchronization devices may be verified. Each remote synchronization device has a different address.

The remote setting may be used to send time offsets to remote synchronization devices that are not using wireless as their input time source. If the remote synchronization device is using the wireless as the input time source, there is no need to use the remote setting function since they will just repeat the wireless time that is received by them. The following offsets may be transmitted: (1) GPS UTC time offset; (2) generator offset time; (3) basic mode audio start time. No input time type, analog output time type or audio/trigger file name may be transmitted. The remote setting may shift the offset time on the remote synchronization devices that have previously been configured. For example, consider the example of three synchronization devices, each using GPS as the input source. If the show is planned to start at 22:00:00, all of the units may be be pre-configured with the input type, output type, offsets, audio file, etc. Now, if the show time needs to be changed (to 22:30:00, for example) it can be done on the master synchronization device and the configuration settings wirelessly sent to the remote synchronization devices. Even though the remote synchronization devices are using GPS as the input time, as long as the wireless is configured as a remote synchronization device, a master synchronization device may adjust the time offsets.

A synchronization device may not be configured as a master synchronization device when only using the remote settings function. Whenever the remote settings function is entered, that synchronization device automatically becomes a temporary master synchronization device. Referring to the above mentioned example, no master synchronization device is needed when all three synchronization devices are synchronized to GPS. In this example, all three synchronization devices may be configured as remote synchronization devices and then the offset time may be re-configured on the main synchronization device at the control location for all other synchronization devices.

The synchronization device may be configured to perform multiple timed events, or triggers, for a number of functions.

In Basic Mode, only one event may happen at a time (e.g., process a single audio file or no audio file). Basic Mode allows the user to select any input time, adjust it by any offset and output the resulting time. In Trigger Mode, more than one event may happen at a time, as well as when relay contacts are used. Triggers may allow the user to program multiple events to initiate simultaneously or at a desired time, including: (1) starting and stopping multiple media files at different output times; (2) closing and opening contacts/logic levels; (3) enabling and disabling time code output. The synchronization device may be configured for more than one trigger. For example, synchronization device may be configured for up to 16 triggers.

In The synchronization device may be configured with the following triggers types:

| | |
|---|---|
| AudioStart | Starts playback of a media file at the specified time. |
| AudioStop | Stops playback of a media file at the specified time. (The media file may stop automatically when it has played in its entirety. |
| ContactClose | Closes the contact/5 V output at the specified time. |
| ContactOpen | Opens the contact/5 V output at the specified time |

The trigger events may happen at the output time specified. When the output time equals a set trigger time, that trigger is performed. For example, the synchronization device may be configured to play an audio file at 05:00:00 output time by closing the contact at 05:05:00 and opening the contact at 05:10:00. The synchronization device may be programmed such that the triggers are configured for more complex timing requirements, such as playing different media files at different times and activating the contact relay.

EXAMPLES

The synchronization devices and methods of use described herein may be better understood when read in conjunction with the following representative examples. The following examples are included for purposes of illustration and not limitation.

Example 1: Generator Mode to FireOne FSK Output Time with WAV or MP3 File Playback This display will start manually from the front panel of the synchronization device. There is a media file called "Kalimba" that goes with the show. A 30 second countdown is desired to verify that all locations are receiving time code prior to the show. The settings and steps are as follows:

1. Set the show offset. Since the show is started manually and a 30 second countdown is desired, the offset is "−00:00:30". When the generator is started, the output time will be −00:00:30.

2. Change the Input source to "Generator".

3. Change the Output time code to FSK F1.

4. Press the SAVE (Checkmark) button to accept the changes.

5. Under the Basic Mode Audio Start Time menu, set the time to 00:00:00.

6. Select the media file "Kalimba".

7. At this point, the audio and time code are idle. The output time is "−00:00:30" and it will not be counting yet.

8. Upon pushing the Play button, the synchronization device will generate negative FSK time code for 30 seconds. At zero seconds the audio track will begin to play.

Example 2: Generator Mode to FireOne FSK Output Time with WAV or MP3 Audio File Playback, Wirelessly Linked to Remote Synchronization Devices This display will start manually from the front panel of the synchronization device. There is a media file called "Kalimba" that goes with the show. A 30 second countdown is desired to verify that all locations are receiving time code prior to the show.

Both the control location (master synchronization device) and the remotely located (remote synchronization devices) are configured as follows:

1. Set the show offset on the master synchronization device. Since the show is started manually and a 30 second countdown is desired, put in the value "−00:00:30" in that field. When the generator is started, the output time will be −00:00:30.

2. Change the Input source to "Generator."

3. Change the Output time code to FSK F1.

4. Press the SAVE (Checkmark) button to accept the changes.

5. Change the wireless setting to either Master or Remote. (This depends on which synchronization device is being configured.) Press the SAVE (CheckMark) button to save wireless setting.

6. Set the time to 00:00:00.

7. Setup the remote synchronization devices inputs correctly.

8. For the master synchronization device, the Input Type is set to Generator and the Output is set to FSK_F1, and the Wireless Status is displaying MST. For the remote synchronization devices, the Input Type is set to Wireless so that wireless communication is recognized by the remote synchronization devices, and the Wireless Status is displaying the wireless channel number and address or "OFF" if the wireless is misconfigured and is off.

9. Attach wireless antennas to all synchronization devices and connect the appropriate cable for each synchronization device.

10. Select the media file "Kalimba".

11. At this point, the audio and time code are idle. The output time is "−00:00:30" and it will not be counting yet.

12. Upon pushing the Play button, the synchronization device will generate negative FSK time code for 30 seconds. At zero seconds the audio track will begin to play.

13. The Play and Stop buttons are available on the master synchronization device. Pushing the Play button will start the master synchronization device playing the music file and time code. The wireless link will input a start command to the associated remote synchronization devices and keep them synchronized. Pushing Stop will stop both the master and remote synchronization devices.

Example 3: GPS Input to FireOne FSK Output Time with WAV or MP3 File Playback

This display will start at 9:30 PM (21:30:00) in London, England using a media file called "Kalmiba".

1. Check that the UTC Time Offset value is set to "00:00:00" in the "GPS Settings" menu. This setting allows the clock to be set to local time.

2. Set the show offset. Since the show is scheduled to fire at 21:30, put in the value "−21:30:00" in that field. The synchronization device will add the offset value to the incoming time and the output time will be "00:00:00" at 21:30.

3. Change the Input source to "GPS."

4. Change the Output time code to FSK F1.

5. Press the SAVE (Checkmark) button to accept the changes.

6. Under the Basic Mode Audio Start Time, set the time to 00:00:00.

7. The HOME screen should now show "GPS Sats:" on the Input side and FSK_F1 on the output side of the screen.

8. Select the media file "Kalimba".

9. At this point, the audio and time code are idle. The output time indicates the time that will be available at the analog time code output connection when the output becomes active. In the above example: at 21:00:00 incoming time, the synchronization device will output −00:30:00. When the output clock reaches 00:00:00 (at 21:30:00) the way file will start playing.

Example 4: GPS Input to FireOne FSK Output Time No Audio File Playback

There is a display that is scheduled to fire at 12:00 AM (00:00:00). There is no audio file for this location and the show is being shot in Sydney, Australia. The settings and steps are as follows:

1. Check that the UTC Time Offset value is set to "+11:00:00" in the "GPS Settings" menu. This setting allows the clock to be set to local time.

2. Set the show offset. Since the show is scheduled to fire at 00:00:00, put in the value 00:00:00" in that field. The time machine will add the offset value to the incoming time and the output time will be "00:00:00" at 00:00:00.

3. Change the Input source to "GPS."

4. Change the Output time code to FSK F1.

5. Press the SAVE (Checkmark) button to accept the changes.

6. The Input Type is set to GPS and the Output is set to FSK_F1.

7. Select "No Audio File, Time Code Only".

8. At this point, the audio and time code are idle. The output time indicates what time would be put out the analog time code port if it were active. In the above example: at 23:50:00 incoming time, the synchronization device will output −00:10:00.

Example 5: SMPTE Time Input Converted to FireOne FSK Output No Audio File

In this example, the user wants to output FireOne FSK time based on SMPTE 25 input time. At 10:00:00 SMPTE time, the user wants the FireOne FSK output time to be 00:00:00. Meaning at 09:55:00 SMPTE time, the FireOne FSK time should be −00:05:00.

1. Set the show offset. Put "−10:00:00" in the offset field.

2. Change the Input source to "Analog TC." The synchronization device will automatically identify the incoming analog time code.

3. Change the Output time code to FSK F1.

4. Press the SAVE (Checkmark) button to accept the changes.

5. At this point, the input is "Analog:S25:" and the output is FSK F1.

6. Select "No Audio File, Time Code Only".

7. When incoming analog time is valid, the input time will be shown in the upper left of the HOME screen. The output time will be offset by −10:00:00. When the input time is 09:00:00 the output time will be −01:00:00. When the input time is 10:00:00, the output time will be 00:00:00.

Example 6: SMPTE Time Shift with No Audio File

In this example, the user simply wants to shift the incoming SMPTE30 time to SMPTE30 by +04:30:00 (4 Hours and 30 minutes).

1. Set the show offset. Put "+04:30:00" in the offset field.
2. Change the Input source to "Analog TC." The synchronization device will automatically identify the incoming analog time code.
3. Change the Output time code to SMPTE30n (non-drop frame SMPTE30).
4. Press the SAVE (Checkmark) button to accept the changes.
5. At this point, the input is "Analog:S25:" and the output is FSK F1.
6. Select "No Audio File, Time Code Only".
7. When incoming analog time is valid, the input time will be shown in the upper left of the HOME screen. The output time will be offset by +04:30:00. When the input time is 01:00:00 the output time will be 05:30:00. When the input time is 20:00:00, the output time will be 00:30:00.

Example 7: GPS Input to SMPTE24 Converter

In this example, the user wants to output the GPS time as SMPTE24 indefinitely. There is no time shift required. The unit is located in Washington D.C., United States (UTC offset of −05:00:00).
1. Set the UTC Time Offset value to "−05:00:00". This setting allows the clock to be set to local time.
2. Set the show offset. Put "00:00:00" in the offset field.
3. Change the Input source to "GPS."
4. Change the Output time code to SMPTE24.
5. Press the SAVE (Checkmark) button to accept the changes.
6. At this point, the input is "GPS Sats:" and the output is SMPTE24.
7. Select "No Audio File, Time Code Only".
8. The output time should match the input time when the GPS receiver has acquired the GPS satellites and the time is valid.

Each of the characteristics and examples described above, and combinations thereof, may be said to be encompassed by the present invention. The present invention is thus drawn to the following non-limiting aspects:

(1) A synchronization device for synchronizing at least one signal with an initiation of an event, the device comprising: a time code generator to generate a first time code signal; a synchronization logic unit to calculate a time delay between the first time code signal and a second time code signal to determine when to initiate the event, and generate a time delay signal; and an output unit coupled to the time code generator and the synchronization logic unit to receive the time delay signal and generate a signal output to initiate the event in synchronization with the first time code signal.

(2) The device according to aspect 1 comprising a controller in electronic communication with the output unit and programmed to initiate the event.

(3) The device according to any of aspects 1-2, wherein the event comprises at least one of an audio event, a video event, a picture event, a laser event, a light event, a pyrotechnic event, theatrical event, and movement of a physical object.

(4) The device according to any of aspects 1-3, wherein the controller is programmed to operatively control at least one of a display, a speaker, a picture, a light, a laser, a pyrotechnic, and an actuator to move the physical object.

(5) The device according to any of aspects 1-4, wherein the controller comprises a time clock to generate the second time code signal.

(6) The device according to any of aspects 1-5, wherein the first time code signal comprises one of an initiation time, a time of day, and an elapsed time, and the second time code signal comprises a universal time.

(7) The device according to any of aspects 1-6 comprising a Global Positioning System receiver to receive at least one of the first time code signal comprising the time of day and the second time code signal comprising the universal time selected from Coordinated Universal Time (UTC) and Greenwich Mean Time (GMT).

(8) The device according to any of aspects 1-7, wherein the synchronization device transmits the time delay signal to the output unit.

(9) The device according to any of aspects 1-8 comprising a communication device in electronic communication with the output unit to transmit the signal output to the controller to initiate the event.

(10) The device according to any of aspects 1-9, wherein the communication device comprises at least one of a frequency-hopping spread spectrum (FHSS) communication device and an Ethernet communication device.

(11) The device according to any of aspects 1-10, wherein the time code comprises at least one of Society of Motion Picture and Television Engineers (SMPTE) formats with a default frame rate, SMPTE format with a frame rate of 24 frames/second, SMPTE format with a frame rate of 25 frames/second, SMPTE format with a frame rate of 29.97 frames/second, SMPTE format with a frame rate of 30 frames/second, SMPTE format with a frame rate of 50 frames/second, SMPTE format with a frame rate of 50.95 frames per second, SMPTE format with a frame rate of 60 frames per second, UTC format, GMT format, FireOne fsk format, Pyrodigital fsk format, and MIDI format.

(12) The device according to any of aspects 1-11 comprising a storage device is in electronic communication with the controller to store at least one of audio data, video data, and control data.

(13) The device according to any of aspects 1-12 comprising a display coupled to the time code generator and synchronization logic unit to display at least one of a value of the first time code signal and a value of the time delay signal.

(14) The device according to any of aspects 1-13 comprising a controller in electronic communication with at least one of a display, a speaker, a picture, a light, a laser, a pyrotechnic, and an actuator to move the physical object.

(15) A system to synchronize an initiation of a plurality of events, the system comprising: a master synchronization device comprising the device according to any of aspects 1-14; and a remote synchronization device comprising the device according to any of aspects 1-14; wherein the master synchronization device is in electronic communication with a network to the remote synchronization device and transmits the signal output via the network to the remote synchronization device to synchronize the plurality of events.

While particular embodiments of electrical interconnection devices have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific devices, systems, and methods described herein, including alternatives, variants, additions, deletions, modifications and substitutions. This application including the appended claims is therefore intended to cover all such changes and modifications that are within the scope of this application.

What is claimed is:

1. A synchronization device for synchronizing at least one signal with an initiation of an event, the device comprising:
a time code generator to generate a first time code signal;
a synchronization logic unit to calculate a time delay between the first time code signal and a second time code signal to determine when to initiate the event, and generate a time delay signal; and
an output unit coupled to the time code generator and the synchronization logic unit to receive the time delay signal and generate a signal output to initiate the event in synchronization with the first time code signal;
wherein the time code comprises at least one of Society of Motion Picture and Television Engineers (SMPTE) formats with a default frame rate, SMPTE format with a frame rate of 24 frames/second, SMPTE format with a frame rate of 25 frames/second, SMPTE format with a frame rate of 29.97 frames/second, SMPTE format with a frame rate of 30 frames/second, SMPTE format with a frame rate of 50 frames/second, SMPTE format with a frame rate of 50.95 frames per second, SMPTE format with a frame rate of 60 frames per second, UTC format, GMT format, FireOne fsk format, Pyrodigital fsk format, and MIDI format.

2. The device of claim 1 comprising a controller in electronic communication with the output unit and programmed to initiate the event.

3. The device of claim 2, wherein the event comprises at least one of an audio event, a video event, a picture event, a laser event, a light event, a pyrotechnic event, theatrical event, and movement of a physical object.

4. The device of claim 3, wherein the controller is programmed to operatively control at least one of a display, a speaker, a picture, a light, a laser, a pyrotechnic, and an actuator to move the physical object.

5. The device of claim 2, wherein the controller comprises a time clock to generate the second time code signal.

6. The device of claim 1, wherein the first time code signal comprises one of an initiation time, a time of day, and an elapsed time, and the second time code signal comprises a universal time.

7. The device of claim 6 comprising a Global Positioning System receiver to receive at least one of the first time code signal comprising the time of day and the second time code signal comprising the universal time selected from Coordinated Universal Time (UTC) and Greenwich Mean Time (GMT).

8. The device of claim 1, wherein the synchronization device transmits the time delay signal to the output unit.

9. The device of claim 1 comprising a communication device in electronic communication with the output unit to transmit the signal output to the controller to initiate the event.

10. The device of claim 9, wherein the communication device comprises at least one of a frequency-hopping spread spectrum (FHSS) communication device and an Ethernet communication device.

11. The device of claim 2 comprising a storage device is in electronic communication with the controller to store at least one of audio data, video data, and control data.

12. The device of claim 1 comprising a display coupled to the time code generator and synchronization logic unit to display at least one of a value of the first time code signal and a value of the time delay signal.

13. The device of claim 1 comprising a controller in electronic communication with at least one of a display, a speaker, a picture, a light, a laser, a pyrotechnic, and an actuator to move the physical object.

* * * * *